June 28, 1932.  L. B. KICK  1,865,420
HUB PULLER
Original Filed May 23, 1930
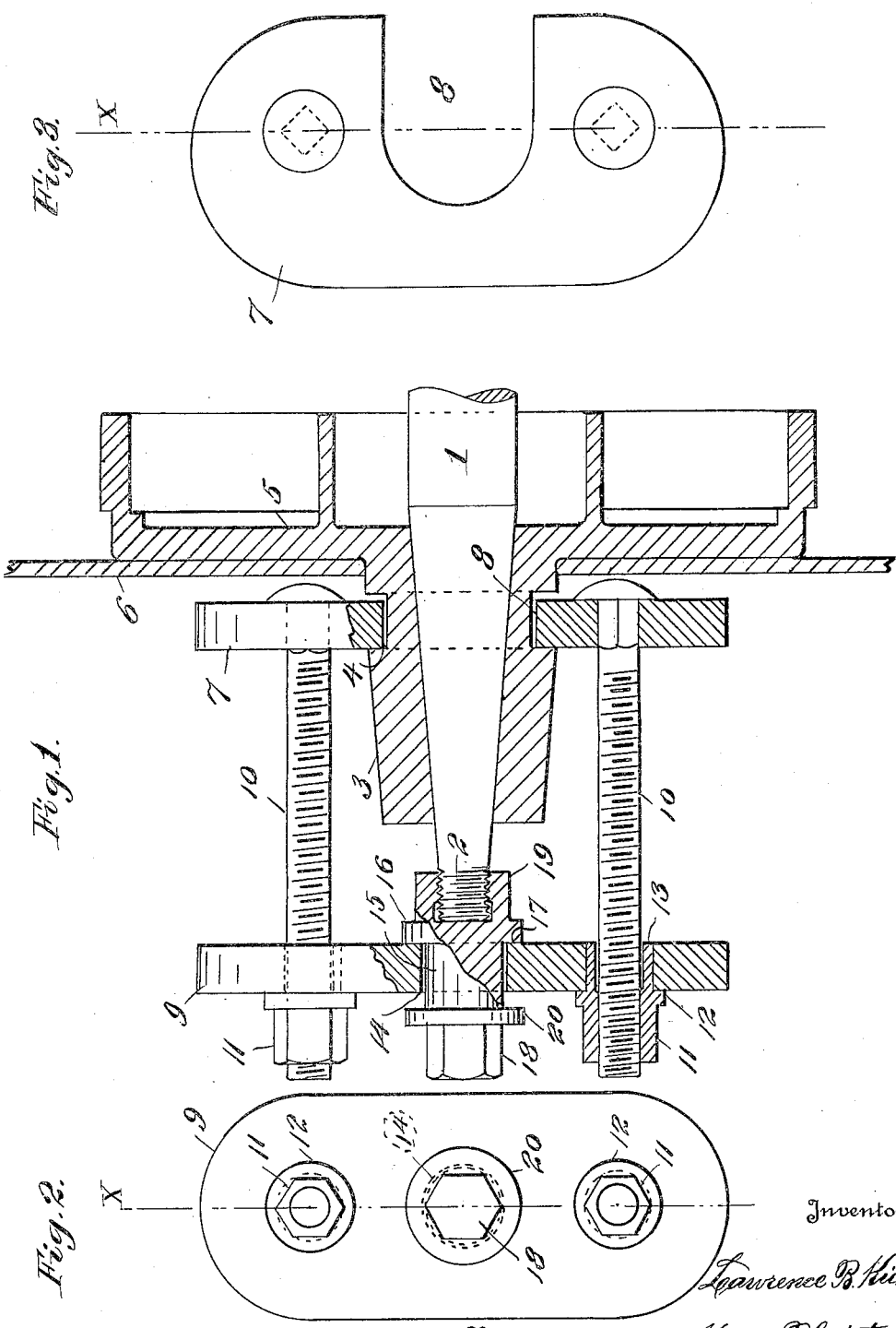

Patented June 28, 1932

1,865,420

UNITED STATES PATENT OFFICE

LAWRENCE B. KICK, OF PINE LAWN, MISSOURI

HUB PULLER

Application filed May 23, 1930, Serial No. 454,933. Renewed November 18, 1931.

This invention relates to certain new and useful improvements in hub pullers, the peculiarities of which will be hereinafter fully described and claimed.

The main objects of my invention are first, to provide an efficient hub puller; secondly, to provide a hub puller adapted to transmit directly to the axle from which it is desired to remove the wheel hub, the full force of a hammer blow while the hub itself is under stress of tension bolts; thirdly, to apply such starting force to the axle without damage to the threads on the ends of the axle; and fourthly, to other objects hereinafter described and claimed.

In the accompanying drawing on which like reference numerals indicate corresponding parts, Fig. 1 represents a plan view of my device partly in section as applied to an axle having a wheel hub mounted thereon, as shown in section;

Fig. 2, an end view of the outer plate of my device; and

Fig. 3, a face view of the inner plate of my device.

The numeral 1 designates the axle or rear shaft of an automobile preferably tapering having its outer end 2 threaded for the usual hub cap. This axle is mounted in hub 3 having a circumferential groove 4 forming shoulders near the disc wall 5 of the brake drum to the front of which is fastened the wheel plate 6 in the usual manner.

Various means have been used to remove such a hub from a wheel axle, which is necessary whenever any repairs are to be made in overhauling the rear end, to reline the brakes, and in practically all cases of trouble with the rear end of an automobile. Such previous devices have depended mainly upon the wedging action of screws applied to the axle in one direction while tension bolts or other means applied to the hub in the opposite direction. Such a screw pressure is often insufficient to start the relative movement of the axle in regard to the hub.

In my device I apply bolts under tension tending to pull the hub from the axle in connection with a slidable piece acting as a fulcrum upon the end of the axle while the bolts are in tension, and adapted to be driven directly against the axle by the force of a hammer blow upon said slidable piece.

The groove 4 in the hub is engaged by a back or inner plate 7 of my device with a a notch 8 of U-shape so that the said plate may slip over the hub and the face adjacent to the notch forms shoulders to engage corresponding shoulders of the groove and bring the tension bolts mounted in the ends of said plate, practically in the same horizontal plane X through the axis of the axle as indicated in Fig. 3. The head end of these bolts is fixed in the said plate 7 by means of square holes and carriage bolts or other means.

Another plate 9 is disposed parallel to the inner plate and has matching holes for reception of the outer ends of tension bolts 10 passing loosely through the outer plate and having on their ends castle nuts 11 the flanges 12 of which bear on the outer side of the plate 9 and are preferably provided with sleeves 13 loosely mounted in the outer plate and extending inward around the threaded ends of the tension bolts to guard such threads from contact with the plate 9 in the adjustment of same.

Centrally disposed in the outer plate 9 is a hole 14 in the plane X of the tension bolts and axis of the shaft. In this hole is loosely mounted the rounded body portion 15 of a slidable piece having a collar 16 forming a resisting shoulder 17 adapted to bear on the inner face of the plate 9. The outer end 18 of said piece is hexagonal or otherwise adapted for turning the piece to mount its inner end 19 having a threaded socket adapted to fit upon the threaded end 2 of the axle and seat the end of the axle against the bottom of the socket as indicated in Fig. 1.

When the castle nuts 11 on the ends of tension bolts 10 are turned up, they draw the plates towards each other until the shoulder 17 bears against the inner face of the plate 9 as a fulcrum, and further turning of the nuts will put a tension on the bolts and this tension is resisted by the shoulder 17, as a fulcrum. Such action tends to pull the hub forward and to force the axle backwards, but such movement can be unfailingly obtained by the use of a hammer upon the outer end of the slidable piece. Since this piece is loosely mounted in the plate 9, the force of such a blow is directly transmitted to the axle, and experience has proved that it starts the hub from its seat on the axle with unfailing regularity.

Upon said sliding piece is welded or otherwise secured an outer collar 20 which forms a groove with the collar 16, the width of which groove is considerably more than the thickness of the outer plate 9. Thus the hammer blow upon the end 18 of said piece will cause it to slide inward with the axle when the latter starts from its frozen connection with the hub, and the inner movement of said slidable piece will be limited by said collar 20 bringing it up against the outer plate 9. This collar 20 has the function of keeping the parts of the device conveniently connected without interfering with the slidable motion of the centrally disposed piece in the hole 14.

I claim:

1. A hub puller comprising two plates, tension bolts connecting said plates, one plate having a notch adapted to fit into a groove in a hub and the other plate having a hole centrally disposed between said bolts, and a slidable piece loosely mounted in said hole and having a shoulder adapted to bear on the plate when the bolts are tensioned and also to engage its end with an axle disposed in said hub and in line with said slidable piece, substantially as described.

2. A hub puller comprising two plates, tension bolts connecting said plates, one plate having a notch adapted to fit into a groove in a hub on an axle and the other plate having a hole centrally disposed between said bolts, and a slidable piece loosely mounted in said hole and adapted to engage said axle and having two collars forming a groove of greater width than the thickness of the plate in which it is mounted, one collar being adapted to engage the inside of the plate to resist the tension of the bolts and the other collar to limit the sliding movement of the piece in the hole and against the axle engaged by said piece, substantially as described.

3. A hub puller comprising two plates having bolt holes near their ends, tension bolts mounted in said holes and connecting said plates, one plate having a notch forming shoulders substantially in the plane of said bolts and adapted to engage corresponding shoulders in a hub mounted on an axle disposed in said notch and the axle having a threaded end adjacent to the other plate, and a slidable piece mounted in a central hole in the latter plate and having a threaded socket adapted to engage the end of the axle and also having a resisting shoulder engaging the inner face of the plate in which it is mounted to serve as a fulcrum when the bolts are tensioned, substantially as described.

4. A hub puller comprising two parallel inner and outer plates having holes near their ends, tension bolts having their heads fixed in the inner plate and their threaded ends passing loosely through the outer plate, castle nuts on said bolts adapted to bear on the outside of the outer plate and having sleeves loosely mounted in the outer plate and guarding the bolt threads therefrom, and a slidable piece centrally disposed in the outer plate and having a resisting shoulder adapted to engage the inner face of the outer plate as a fulcrum when the bolts are tensioned, substantially as described.

In testimony whereof I have affixed my signature.

LAWRENCE B. KICK.